United States Patent [19]

Sood et al.

[11] Patent Number: 4,833,878
[45] Date of Patent: May 30, 1989

[54] WIDE RANGE GASEOUS FUEL COMBUSTION SYSTEM FOR GAS TURBINE ENGINES

[75] Inventors: Virendra M. Sood, Olivenhain; Leslie J. Faulder, San Diego, both of Calif.

[73] Assignee: Solar Turbines Incorporated, San Diego, Calif.

[21] Appl. No.: 162,825

[22] Filed: Mar. 2, 1988

Related U.S. Application Data

[62] Division of Ser. No. 037,296, Apr. 9, 1987, Pat. No. 4,761,948.

[51] Int. Cl.$^4$ .................................. F02C 3/22; F02C 7/26
[52] U.S. Cl. .............................. 60/39.06; 60/39.141; 60/39.463
[58] Field of Search ............... 60/39.06, 39.12, 37.141, 60/39.281, 39.463, 39.465, 742; 431/228, 281, 284

[56] References Cited

U.S. PATENT DOCUMENTS

| | | | |
|---|---|---|---|
| 2,621,476 | 12/1952 | Sedille | 60/39.463 |
| 2,828,605 | 4/1958 | Dobson | 60/39.463 |
| 3,577,877 | 5/1971 | Warne | 60/39.141 |
| 4,253,301 | 3/1981 | Vogt | 60/39.463 |
| 4,369,803 | 1/1983 | Furr | 432/12 |

FOREIGN PATENT DOCUMENTS 77522 6/1981 Japan .................................. 60/39.463

Primary Examiner—Louis J. Casaregola
Attorney, Agent, or Firm—Larry C. Cain

[57] ABSTRACT

Systems capable of supplying either all gaseous fuel, all liquid fuel, or a mixture of the two, at a preselected ratio have been successfully employed in gas turbine engines. The mixing of such fuels has taken place in the combustion chamber and has caused the nozzle design and system controls to complicate the structure and increase costs. The subject system for burning gaseous fuels having a range of calorific values has overcome these problems by providing a simple inexpensive system. The system uses a starting step where only high calorific value gaseous fuel is injected through a first fuel supply passage of an injector and operates the engine to a preestablished engine operating parameter. After the preestablished engine operating parameter has been reached a low calorific value gaseous fuel is mixed in a mixing chamber outside the combustion chamber and injected through the first fuel supply passage until a level of heating value of the mixed fuel or a second engine operating parameter has been reached. The mixing continues and a second fuel supply passage of the injector is opened to increase the mass/volume flow of fuel into the engine. The ratio of low calorific value gaseous fuel increases and the high calorific value gaseous fuel decreases as the engine operating parameters are monitored until the engine operates on only the low calorific value gaseous fuel.

4 Claims, 2 Drawing Sheets

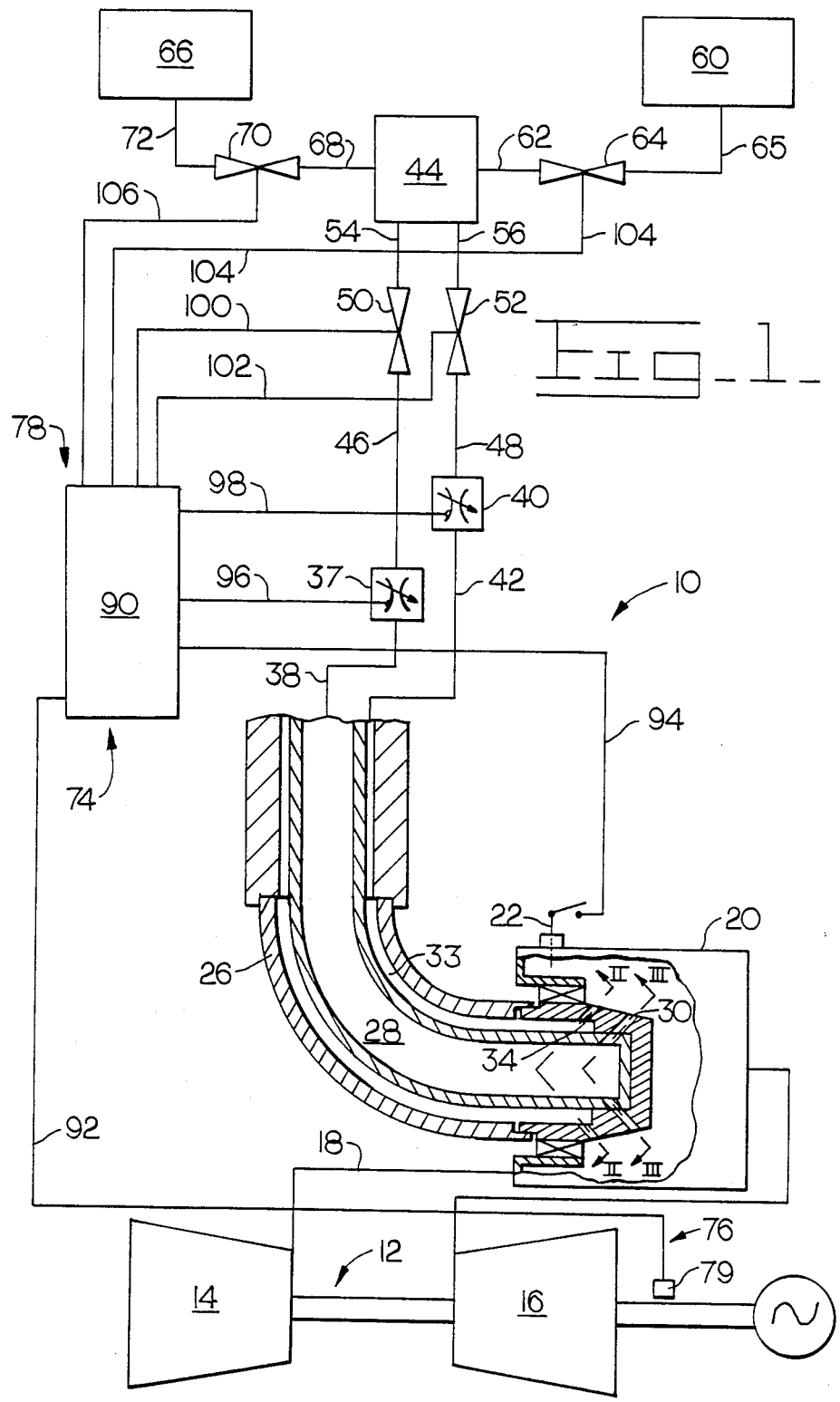

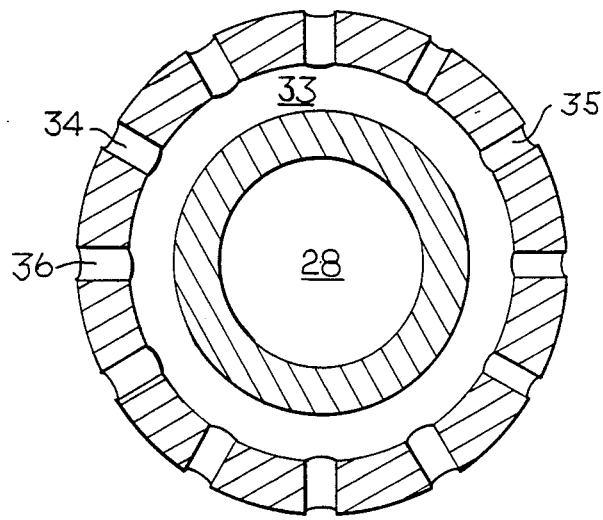
Fig_2_
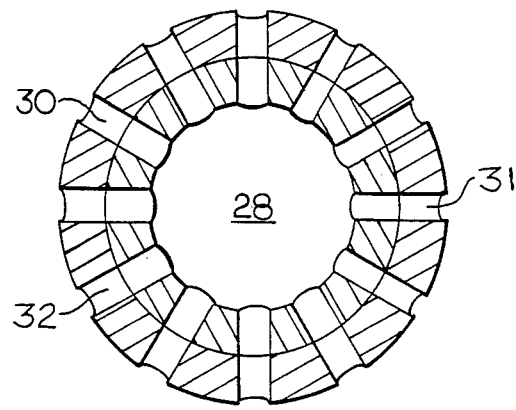
Fig_3_

WIDE RANGE GASEOUS FUEL COMBUSTION SYSTEM FOR GAS TURBINE ENGINES

This is a division of Ser. No. 037,296, filed Apr. 9, 1987, now U.S. Pat. No. 4,761,948.

TECHNICAL FIELD

This invention relates generally to gas turbine engines and more particularly to a system for burning gaseous fuels having a range of calorific values.

BACKGROUND ART

Fuel systems capable of supplying either all gaseous fuel, all liquid fuel, or a mixture of the two at a preselected ratio have been successfully employed in gas turbine engines. In some instances it is desirable to be able to burn gaseous fuels having a range of calorific values in a gas turbine engine. It can be appreciated that in a place where a more economical fuel, such as a low calorific value fuel in a gas producing area, is available, it would be more economical to arrange the turbine engine to use only the low calorific value fuel to the maximum extent. In most gas producing areas the high calorific value fuel or natural gas can be sold at a profit to a waiting customer, however; the low calorific value fuel is a by-product with little or no market value. Therefore, it is desirable to utilize such low calorific value fuel on site as a fuel. Such fuels, however, are difficult to use in a gas turbine engine. For example, it is very difficult to start a gas turbine engine on low calorific value fuel. Furthermore, the low calorific value of the fuel will necessitate the burning of a greater mass/volume of fuel in order to achieve desired turbine inlet temperature within the turbine engine versus the mass/volume of fuel when burning high calorific value fuel.

A dual fuel system is disclosed, for instance in U.S. Pat. No. 2,637,334, to N. E. Starkey issued May 5, 1953. The Starkey patent discloses a dual fuel system where liquid fuel is directed to a manifold and then to a passage in the nozzle and a gaseous fuel is directed to a separate manifold and then to a different passage in the nozzle.

U.S. Pat. No. 2,826,038 issued to James Forrest Shannon et al on Mar. 11, 1958 discloses a gas turbine engine which utilizes a liquid fuel injected into the combustion chamber by a fuel pump and a low calorific value gaseous fuel supplied through a separate duct into the combustion chamber. Shannon et al provides means for diverting a proportion of the pressure air from the combustion chamber and means for converting the energy of the diverted air into useful work, whereby during the supply of low calorific value fuel to the combustion chamber air may be diverted from the combustion chamber in proportion corresponding in mass flow to the additional mass flow of fuel necessary to achieve the desired nozzle temperature.

The primary problems encountered by the prior art systems are firstly, the different fuels have been injected into the combustion chamber through separate passages or ports each connected to the different fuel source. The different calorific value of the fuel and corresponding different mass flow rate required to provide necessary fuel quantities require different fuel injector designs. For example, orifice sizes must be different to supply the quantities of fuel needed to achieve proper turbine inlet temperatures if proper fuel injector pressure drop, to control combustion process, is to be maintained. If a fuel injector has been designed for a high BTU fuel, unacceptably high fuel injector pressure drops will occur at the fuel injector when running on low BTU fuel. On the other hand if a fuel injector has been designed to operate on low BTU fuel, very low fuel injector pressure drops will occur when running on high BTU fuel; this could cause combustion driven oscillations resulting in damage to the gas turbine. Secondly, the art teaches that the atomization and mixing of the different fuels within the combustion chamber to provide efficient burning (fuel to air ratio and mixing) and power requirements require controls to provide varied amounts of combustion air. Thirdly, starting a gas turbine engine on low calorific value fuel is very difficult to accomplish. Fourthly, complexity problems are encountered when trying to proportion the combustion air needed to provide the appropriate fuel to air ratio for proper burning when burning the needed mass/volume flow of the relatively low calorific value fuel.

These problems as mentioned above complicate the structures, increase cost and complicate the system design used to burn fuels having a range of calorific values.

The present invention is directed to overcoming one or more of the problems as set forth above.

DISCLOSURE OF THE INVENTION

In one aspect of the present invention a system for burning gaseous fuels having a range of calorific values in a combustion chamber is disclosed. The system is comprised of at least one fuel injector located in the combustion chamber and having a first fuel supply passage and a second fuel supply passage, a first throttle valve connected to the first fuel supply passage, a second throttle valve connected to the second fuel supply passage, a chamber connected to the first and second throttle valves, a first control valve connected to the chamber and being connectable to a source of high calorific value gaseous fuel, a second control valve connected to the chamber and being connectable to a source of low calorific value gaseous fuel, and means for selectively controlling the first and second throttle valves and the first and second control valves in response to preestablished engine parameter so that one of the high calorific value gaseous fuel, the low calorific value gaseous fuel and a mixture of the high and low calorific value gaseous fuels is selectively supplied to the gas turbine engine.

In another aspect of the present invention, a method of burning gaseous fuels having a range of calorific values in a combustion chamber of a gas turbine engine comprises the steps of starting the engine by injecting only a high calorific value gaseous fuel into the combustion chamber through a first fuel supply passage, monitoring an operating parameter of the engine to determine when a first preestablished operating parameter of the engine has been established; mixing a low calorific value gaseous fuel with the high calorific value gaseous fuel in a mixing chamber when the preestablished parameter of the engine has been established with the mixing step including the steps of decreasing the quantity of high calorific value gaseous fuel and increasing the quantity of low calorific value gaseous fuel, controllably throttling the mixture of high and low calorific value gaseous fuel through the first fuel supply passage and a second fuel supply passage, and stopping the flow of high calorific value gaseous fuel and thereafter operating the engine on only the low calorific value gaseous fuel.

BRIEF DESCRIPTION OF THE DRAWINGS

FIG. 1 is a schematic view of the system used to burn gaseous fuels having a range of calorific values in the gas turbine engine;

FIG. 2 is an enlarged sectional view taken along lines II—II of FIG. 1; and

FIG. 3 is an enlarged sectional view taken along lines III—III of FIG. 1.

BEST MODE FOR CARRYING OUT THE INVENTION

In reference to FIG. 1 a system 10 for burning gaseous fuels having a range of calorific values is shown in combination with a gas turbine engine 12. The engine 12 is of generally conventional design and includes a compressor 14, a power turbine 16, an air supply system 18, a combustion chamber 20, and an ignition system 22.

The system 10 includes a fuel injector 26 located in the combustion chamber 20 and having a first fuel supply passage 28 centrally located therein. The passage 28 has a plurality of outwardly directed orifices 30, best shown in FIG. 3, each having a preestablished flow area opening into the combustion chamber 20. The flow areaa of some of the orifices of the first passage are different than the preestablished flow area of other orifices of the first passage to prevent hot spots on the combustion chamber 20 walls. For example, the orifices are divided into a first group of orifices 31 and a second group of orifices 32 having a larger flow area than the first group of the orifices 31. More specifically, when more than one fuel injector 26 is arranged in a circular pattern within the combustion chamber 20, the fuel injected from adjacent fuel injectors into the combustion area in line with or between fuel injectors can cause hot spots. To insure against these hot spots, the second group 32 of the orifices 30 on each fuel injector 26 is made smaller to reduce the fuel flow into the area in line with or between injectors where hot spots could be created. The orifices are arranged in an angular pattern selected to control the combustion process within the combustion chamber 20. The fuel injector 26 also includes a second fuel supply passage 33 coaxially located with respect to the first passage 28. The second fuel supply passage has a plurality of outwardly directed orifices 34, best shown in FIG. 2, each of which has a preestablished flow area opening into the combustion chamber 20. The orifices 34 also include a first group of orifices 35 and a second group of orifices 36 having a larger flow area than the first group of orifice 35 to prevent hot spots from occurring as explained above. In the present application, the combined effective flow area of the orifices of the first fuel supply passage 28 and the combined effective area of the orifices of the second fuel supply passage 33 are substantially equal. In alternative applications, the effective area of the orifices in the first fuel supply passage 28 when compared to the effective area of the orifices of the second fuel supply passage 33 may change and may not be equal. A first throttle valve 37 is connected to the first fuel supply passage 28 by a fuel line 38 and a second throttle valve 40 is connected to the second fuel supply passage 33 by a fuel line 42. The first and second throttle valves 37,40 are connected to a mixing chamber 44 by lines 46,48 shut-off valves 50,52 and lines 54,56, respectively.

The mixing chamber 44 is connected to a source of high calorific value gaseous fuel 60 by a fuel line 62, a control valve 64 and a fuel line 65. The mixing chamber 44 is also connected to a source of low calorific value gaseous fuel 66 by a fuel line 68, a control valve 70 and a fuel line 72. The control valves 64 and 70 are conventional electrically operated proportional valves in which the amount of opening is directly proportional to the magnitude of the electrical signal applied thereto.

The system 10 further includes means 74 for selectively controlling the first and second throttle valves 37,40. The control means 74 includes means 76 for monitoring the engine 12 parameter and means 78 for varying and monitoring the proportion of the high and low calorific value gaseous fuels.

The control means 74 includes a sensor 79 which can be a speed or power sensor and an electronic control mechanism 90 of conventional design which receives input signals in a conventional manner. These signals can be electrical, hydraulic or pneumatic and are converted into standard output signals for use by the control means 74. For example, the sensor 79 is connected to the mechanism 90 with a line 92. The mechanism 90 is also connected to the ignition system 22, the first throttle valve 37, second throttle valve 40, shut-off valves 50,52 and control valves 64,70 by conventional feed lines 94,96,98,100,102,104,106, respectively.

Industrial Applicability

The system 10 is used to provide the gas turbine engine 12 with the ability to burn gaseous fuels having a range of calorific values. The gas turbine engine 12 is first started and brought up to rated speed on only the high calorific value gaseous fuel. For example, the control valve 64 is opened to a maximum position, the shut-off valve 50 is opened to a maximum position and the throttle valve 37 is slightly opened. High calorific value gaseous fuel flows from the source of high calorific value gaseous fuel 60 through the connecting line 65, valve 64, line 62, mixing chamber 44, line 54, shut-off valve 50, line 46, throttle valve 37, and line 38 into the first fuel passage 28 of the injector 26, through orifices 30 and into the combustion chamber 20. Air from the air supply system 18 is mixed with the fuel, the ignition system 22 is activated and the engine 12 is started and allowed to accelerate in a conventional manner. Thereafter when the engine is operational at a preestablished operating parameter, approximately 25%–30% of the rated kW output power, the low calorific value gaseous fuel is allowed to mix with the high calorific value gaseous fuel by opening the control valve 70. More specifically in this embodiment as the low calorific value gaseous fuel is mixed with the high calorific value gaseous fuel, the BTU content of the mixed fuel is reduced, the throttle valve 37 opens further to pass the increased mass/volume of fuel demanded by the engine 12 and the fuel pressure at the injector 26 increases. Any further reduction in BTU content is similarly accompanied by further opening of the throttle valve 37 and further increase in fuel pressure at the fuel injector 26. If this process were allowed to continue, the fuel pressure at the injector, due to the increased mass/volume required by the decreasing BTU content of the fuel, will become unacceptably high. To avoid this, at a pre-established level of BTU content of the mixed fuel as determined by relative position of control valves 64,70, before the fuel pressure at injector 26 becomes excessive, control valve 52 is opened, thus allowing the mixed fuel to flow additionally through the second fuel supply passage 33. With the opening of the second fuel supply passage 33, there is a sudden increase in the mass/volume of fuel flow to the engine 12, the fuel pressure at the injector inlet is considerably reduced and the throttle valves 37,40 are repositioned towards the closed position to meet the engine fuel requirements. Any further decrease in BTU content is handled by further simultaneous opening of the throttle valves 37,40, resulting in increased fuel pressure at the injector inlet. Thus we see that the introduction of the fuel into the second fuel supply passage 33 has considerably widened the operational range of the engine on low BTU fuels. Simultaneous with the opening of the second fuel supply passage 33, the minimum stops of throttle valves 37,40 are automatically adjusted in accordance with the BTU content of the mixed gas, to prevent the engine 12 from overspeeding in case of a sudden loss of load.

As an alternative to utilizing the relative position of the control valves 64,70, the relative position of the throttle valve 37 and a signal from the engine sensor 79 together with the ambient temperature and pressure of the air entering the compressor 14 may be used as a preestablished parameter for opening the shut off valve 52 starting the supply of fuel to the second fuel supply passage 33.

Thus the method of burning gaseous fuels having a range of calorific values in the combustion chamber 20 of the gas turbine engine 12 comprises the steps of starting the engine 12 by injecting only the high calorific value gaseous fuel through the fuel injector 26 into the combustion chamber 20 through the first fuel supply passage 28, monitoring an operating parameter of the engine 12 to determine when the first preestablished operating parameter of the engine 12 has been established; mixing the low calorific value gaseous fuel with the high calorific value gaseous fuel in the mixing chamber 44 when the preestablished operating parameter of the engine 12 is established with the mixing step including the steps of decreasing the quantity of high calorific value gaseous fuel and increasing the quantity of low calorific value gaseous fuel, controllably throttling the mixture of high and low calorific value gaseous fuel through the first fuel supply passage 26 and the second fuel supply passage 33, and stopping the flow of high calorific value gaseous fuel and thereafter operating the engine on only the low calorific value gaseous fuel. The mixing of the low calorific value gaseous fuel with the high calorific value gaseous fuel in the mixing chamber further includes monitoring the position of the control valves 64,70 to determine when a preestablished heating value of the mixed fuel has been established. Additionally, supplying the fuel to the second fuel supply passage 33 by opening the shut off valve 52 prevents excessive fuel pressure at the fuel injector inlet.

With the invention as disclosed above, the system 10 for burning gaseous fuels having a range of calorific values has overcome the problem of injecting two different fuel through two separate passages or ports into the combustion chamber by providing the mixing chamber 44 in which high and low calorific value gaseous fuels are mixed prior to injection into the combustion chamber 20 through the first and second fuel supply passage 28,33 in a single injector 26 into the combustion chamber 20. Additionally, excessive fuel pressure at the fuel injector inlet when running on low BTU fuel has been avoided by use of the second fuel supply passage 33. The simplicity of this system has provided low cost and simple structural components. The problem of starting a gas turbine engine 12 when the main source of fuel is a low calorific gaseous fuel has been eliminated by starting on only high calorific value gaseous fuel, mixing the high and low calorific value gaseous fuel in a mixing chamber 44 during an interim change-over phase and subsequently operating the gas turbine engine on only low calorific value gaseous fuel after the mixing operation. The subject system 10 is capable of burning two different calorific value gaseous fuels 60,66 in any proportions by mixing the low and high calorific value fuels outside the combustion chamber. Excessive fuel injector pressure drop or combustion driven oscillations caused by insufficient fuel injector 26 pressure drop has been overcome by providing two separate fuel passages 28,33 in the fuel injector 26; passage 33 can be switched on or off, as required, to maintain proper fuel injector pressure drop.

Other aspects, objects and advantages of this invention can be obtained from a study of the drawings, disclosure and the appended claims.

We claim:

1. A method of burning gaseous fuels having a range of calorific values in a combustion chamber of a gas turbine engine, comprising the steps of:

starting the engine by injecting only a high calorific value gaseous fuel into the combustion chamber through a first fuel supply passage;

monitoring an engine operating parameter to determine when a preestablished value of that operating parameter is achieved;

mixing a low calorific value gaseous fuel with the high calorific value gaseous fuel in a mixing chamber when the preestablished value of that parameter is achieved, said mixing step including the steps of decreasing the quantity of high calorific value gaseous fuel and increasing the quantity of low calorific value gaseous fuel;

controllably throttling the mixture of high and low calorific value gaseous fuel through the first fuel supply passage and a second fuel supply passage;

stopping the flow of high calorific value gaseous fuel and thereafter operating the engine on only the low calorific value gaseous fuel.

2. The method of claim 1, wherein said step of mixing the low calorific value gaseous fuel with the high calorific value gaseous fuel includes the steps of:

controllably opening a first control valve to increase the flow of low calorific value gaseous fuel;

controllably closing a second control valve to decrease the flow of high calorific value gaseous fuel.

3. The method of claim 2, wherein said step of mixing the low calorific value gaseous fuel with the high calorific value gaseous fuel further includes:

monitoring the position of the first and second control valves to determine an existing heating value of the mixed fuel.

4. The method of claim 1, wherein said step of controllably throttling the mixture of high calorific value gaseous fuel and the low calorific value gaseous fuel through the first passage and the second passage includes the steps of:

controllably opening a first and second throttle valve to increase the flow of mixed high and low calorific value gaseous fuel through the second fuel supply passage when a second preestablished value of that operating parameter is achieved.

5. The method of claim 4, wherein said step of monitoring the engine operation parameter to determine when a preestablished value of that parameter is achieved includes an engine sensor, a control valve and a signal therefrom and said step of controllably throttling the mixture of high calorific value gaseous fuel and the low calorific value gaseous fuel through the first passage and the second passage includes the steps of:
controllably opening the throttle valves in response to the relative position of the control valve supplying the fuel to the first fuel supply passage, the signal from the engine sensor and the temperature and pressure of the air entering the compressor.

6. The method of claim 1 wherein said step of controllably throttling the mixture of high calorific value gaseous fuel and the low calorific value gaseous fuel through the first passage and the second passage includes the steps of:
establishing the level of heating value of the mixed fuel;
controllably opening a throttle valve to allow the flow of mixed high and low calorific value gaseous fuel through the second fuel supply passage; and
controllably closing a throttle valve to decrease the flow of mixed high and low calorific value gaseous fuel through the first fuel supply passage.

7. The method of claim 5 wherein said step of controllably throttling the mixture of high calorific value gaseous fuel and the low calorific value gaseous fuel through the first and second supply passage includes the steps of:
controllably opening and closing the throttle valves thereby simultaneously controlling the flow of mixed high and low calorific value gaseous fuel through the first and second supply passages to control the engine operation.

8. The method of claim 1 wherein said step of stopping the flow of high calorific value gaseous fuel includes the steps of:
opening a control valve to a maximum position allowing full flow of low calorific value gaseous fuel; and
closing a control valve to a closed position preventing flow of high calorific value gaseous fuel.

9. The method of claim 1 further including the steps of:
monitoring the magnitude of a signal going to a control valve used to increase the flow of low calorific value gaseous fuel; and
monitoring the magnitude of a signal going to a control valve used to decrease the flow of high calorific value gaseous fuel.

10. The method of claim 8 wherein said step of stopping the flow of high calorific value gaseous fuel includes the steps of:
monitoring the magnitude of the signal going to the low calorific fuel control valve until the low calorific fuel control valve is at a maximum open position; and monitoring the magnitude of the signal going to the high calorific fuel control valve until the high calorific fuel control valve is at its closed position preventing flow of high calorific value gaseous fuel.

11. The method of claim 10, wherein said step of mixing the low calorific value gaseous fuel with the high calorific value gaseous fuel includes the steps of:
monitoring the magnitude of the signal going to the control valve used to increase the flow of low calorific value gaseous fuel;
monitoring the magnitude of the signal going to the control valve used to decrease the flow of high calorific value gaseous fuel;
controllably opening the control valve to increase the flow of low calorific value gaseous fuel; and
controllably closing the control valve to decrease the flow of high calorific value gaseous fuel.

* * * * *

UNITED STATES PATENT AND TRADEMARK OFFICE
CERTIFICATE OF CORRECTION

PATENT NO. : 4,833,878

DATED : May 30, 1989

INVENTOR(S) : Virendra M. Sood and Leslie J. Faulder

It is certified that error appears in the above-identified patent and that said Letters Patent is hereby corrected as shown below:

Column 8, Claim 11, line 1 of claim, "10" should be --8--.

Signed and Sealed this

Thirteenth Day of March, 1990

Attest:

JEFFREY M. SAMUELS

Attesting Officer

Acting Commissioner of Patents and Trademarks